Nov. 22, 1927.  
F. R. FURBISH  
FILTER PRESS CLOTH  
Filed July 19, 1926  
1,649,822
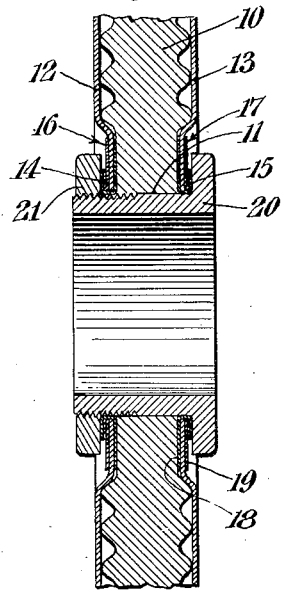
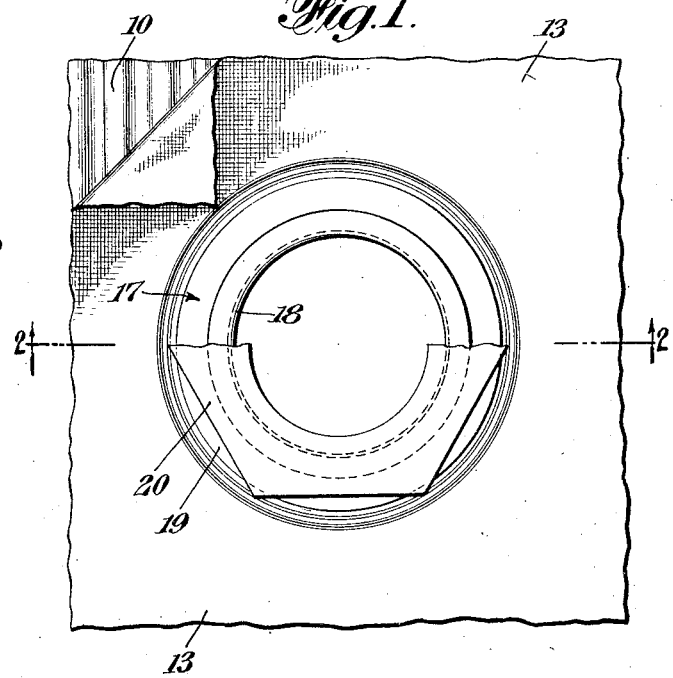
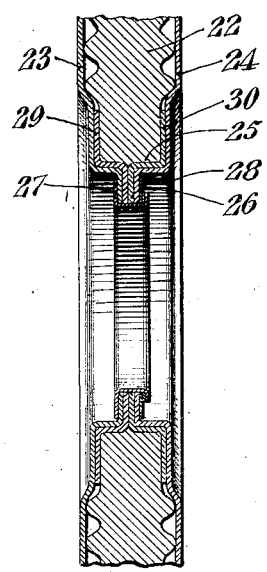
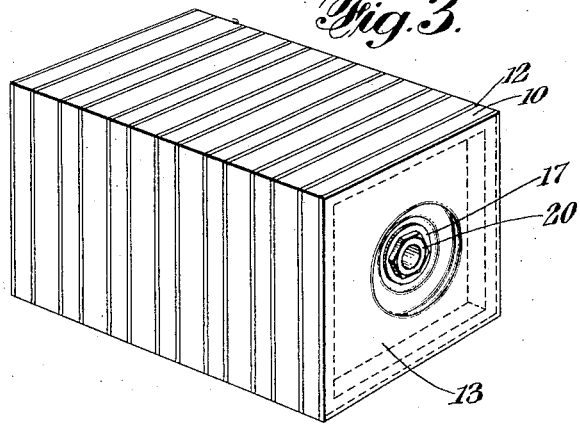
INVENTOR.  
Frank R. Furbish  
BY  
Ward, Crosby + Smith  
ATTORNEYS.

Patented Nov. 22, 1927.

1,649,822

UNITED STATES PATENT OFFICE.

FRANK R. FURBISH, OF NEW YORK, N. Y., ASSIGNOR TO THE FILTER SACK MANUFACTURING CO., OF CLEVELAND, OHIO, A CORPORATION OF OHIO.

FILTER-PRESS CLOTH.

Application filed July 19, 1926. Serial No. 123,363.

My invention relates to improvements in filter press cloths.

The objects of this invention include the provision of a filter cloth construction, which is inexpensive and very durable and efficient for the purposes desired.

Further and more specific objects, features and advantages will more clearly appear from the detailed description given below taken in connection with the accompanying drawings which form a part of this specification.

In the drawings, Fig. 1 comprises an elevational view showing in operative position a portion of a filter cloth which embodies my invention.

Fig. 2 is a sectional view taken substantially upon the line 2—2 of Fig. 1.

Fig. 3 is a perspective view showing a number of filter press frames assembled with filter press cloths thereon of the type embodying my invention, and Fig. 4 is a sectional view corresponding to that of Fig. 2 but showing a modified form of the invention.

Filter cloths or sacks used in hydraulic filter presses have been commonly made by taking two sheets of cloth and providing apertures therein through their central portions and then sewing them together adjacent or around the peripheries of the apertures. In other instances the cloths apertures have been secured together at the apertures by sewing within the apertures supplemental pieces of the fabric. The filter cloth device is then assembled in relation to a filter press plate, whereupon one side of the cloth is adapted to lie against one side of the filter press plate and the other side is adapted to lie against the other side of the filter press plate in a manner well understood in the art. Where the cloth, however, passes into and through the aperture of the plate, it is often distorted or wrinkled because the filter press cloth is not normally formed to fit the peripheral wall of the aperture in the plate. Furthermore, the more or less unprotected edges of the fabric around the peripheries of the apertures often become worn out or frayed before the remainder of the filter cloth has become worn out. Therefore, according to my invention I provide a filter cloth construction, the apertures through which are provided with a desirable form of metallic or other durable edge binding means for preventing excessive wearing or fraying of this portion and also permitting the cloths to be securely clamped and properly fitted to all portions of the filter press plate.

Referring to Figs. 1 and 2, a filter press construction is here shown comprising a filter press plate 10 having a central aperture 11 therethrough for permitting passage between the successive plates of the material to be filtered. The filter press cloth construction shown comprises a pair of cloths 12 and 13, respectively arranged over the opposite faces of the plate 10. The cloths 12 and 13 may be formed of canvas or other known materials suitable for the particular purpose for which the filter press is to be used and, except for the portions adjacent the peripheries of the apertures, the cloths may be constructed in accordance with the usual practice known in the art.

It will be noted that the cloths 12 and 13 are provided with aligned apertures 14 and 15 which are also in alignment with the aperture 11 through the plate 10. Furthermore, the cloth edges at the peripheries of the apertures 14 and 15 are embraced in metallic clamping or binding members 16 and 17 respectively. This binding means may in each case comprise a pair of annular members as at 18 and 19 each formed of relatively thin sheet metal such as copper or brass, or other durable material. These members provide a metallic facing for each side of each cloth around the apertures. One or both of these annular members may be initially formed with an internal upstanding flange for extending through the cloth aperture. After the cloth and annular members are assembled in proper alignment, the upstanding flange or flanges may be spun over or outwardly bent over, as indicated in Fig. 2, to secure the annular members in clamping relation to the fabric edges at the apertures.

After the construction of the cloths has thus been completed, the filter plate 10 may be assembled in respect to the two layers of the cloth, and a suitable bushing 20 provided with a clamping nut 21 may be inserted through the aligned apertures through the plate and cloths. Thereafter, by tightening the nut 21 upon the bushing, the annular binding members 16 and 17 may be brought into liquid tight clamping relation with the plate 10.

It will thus be seen that the fabric edges at the apertures are in each case provided with permanent metallic binding means which may be firmly engaged by the bushing and held in liquid tight clamping relation to the filter press plate without fear of excessive wearing or injuring the fabric at this point. An unbroken metallic surface is provided from one face of each cloth, which surface extends through the aperture and out over the other ring member. Yet the filter cloth may be readily and quickly assembled with respect to the filter plate or removed therefrom without resorting to sewing or other operations which may be inconvenient and uncertain as to their results in some instances.

In Fig. 4 my invention is illustrated in a modified type of construction in which a pair of filter cloths are provided with a single metallic binding means at the aligned apertures therethrough. In this construction the necessity of using the metallic bushing 20 above described is eliminated. This construction is particularly desirable in instances where it is desired to permanently assemble the filter cloths in respect to a filter plate. Referring to Fig. 4 in further detail, a filter press plate 22 is shown with filter cloths 23 and 24 upon the respective faces thereof. An aperture 25 is formed through the plate 22 and in alignment therewith the cloths 23 and 24 are formed with apertures as at 26. However, in this instance the apertures 26 are of somewhat smaller diameter than the aperture 25 through the plate, and accordingly the fabric extends within the plate aperture a sufficient distance to permit a pair of annular metallic clamping members 27 and 28 to be applied and fitted within the aperture 25. Since the fabric of the cloths adjacent the aperture 25 is ordinarily subjected to greater wear than other portions of the cloths, the cloths may be here reinforced with annular fabric members as at 29 and 30 which members are also received within the clamping rings 27 and 28. As in the construction previously described, one or both of the ring or annular members 27 and 28 may be initially formed with upstanding internal flanges which may be bent or spun over into clamping relation with the fabric in the manner above described in connection with Fig. 2.

In Fig. 3 a plurality of filter press plates with filter press cloths of the type shown in Fig. 2 are shown in assembled relation.

While I have described my improvements in great detail and with respect to certain preferred forms thereof, I do not desire to be limited to such forms or details, since many changes and modifications may be made and the improvements embodied in widely different forms without departing from the spirit and scope of the invention in its broader aspects. Hence, I desire to cover all modifications and forms coming within the language of any one or more of the appended claims.

What I claim as new and desire to secure by Letters Patent is:

1. A filter cloth having two layers of cloth adapted to lie in parallel planes, said layers being spaced from one another and having aligned apertures therethrough, and edge binding means at the peripheries of said apertures comprising metallic rings separately embracing the edges, and means being provided to secure said rings against displacement in respect to each other.

2. A filter press cloth having an aperture through the central portion thereof for admission to the filter press of the material to be filtered, and metallic binding means comprising annular metallic members providing a facing at each side of the aperture, one of said members extending with an unbroken surface from one face of the cloth, through the aperture, and outwardly over the outer face of the other member in clamping relation thereto.

3. A filter press cloth having an aperture therethrough for admission of the material to be filtered to the succeeding cloths of the filter press, and a pair of thin annular metallic members one of which is spun into clamping relation with the other at said aperture with the peripheral edges of the cloth at said aperture embraced between the members.

4. A filter cloth having two layers of cloth adapted to lie in parallel planes, said layers being spaced from one another and having aligned apertures therethrough, metallic edge reinforcing means permanently and independently secured at the peripheries of each of said apertures, and means for detachably securing said reinforcing means against the opposite faces of a filter plate in alignment with an aperture therethrough.

5. A filter press cloth having an aperture therethrough for admission of the material to be filtered to the succeeding cloths of the filter press, and a pair of thin annular metallic members reinforcing the cloth edges at said aperture, one of said members having its inner edge turned inwardly through the aperture and then outwardly flared over the outer face of the other member in clamping relation thereto.

In testimony whereof I have signed my name to this specification.

FRANK R. FURBISH.